United States Patent [19]
Kaiser et al.

[11] 3,773,534
[45] Nov. 20, 1973

[54] PROCESS FOR PREPARING A DRY SEMI-PERMEABLE CELLULOSE ACETATE MEMBRANE

[75] Inventors: Wolfgang Kaiser, Neu-Isenburg; Franz Schwarzer, Wiesbaden, both of Germany

[73] Assignee: Kalle Aktiengesellschaft, Wiesbaden-Biebrich, Germany

[22] Filed: Nov. 30, 1971

[21] Appl. No.: 203,437

[30] Foreign Application Priority Data
Dec. 1, 1970 Germany .................. P 20 59 048.1

[52] U.S. Cl. ................ 106/178, 106/189, 106/196, 264/49
[51] Int. Cl. ........................................... C08b 27/44
[58] Field of Search ................... 106/178, 189, 196; 264/49

[56] References Cited
UNITED STATES PATENTS

| | | | |
|---|---|---|---|
| 3,592,672 | 7/1971 | Rowley | 106/196 R |
| 3,567,809 | 3/1971 | Ueno et al. | 106/196 |
| 3,133,137 | 5/1964 | Loeb et al. | 264/49 |
| 3,544,358 | 7/1966 | Manjikian | 264/49 |

*Primary Examiner*—Theodore Morris
*Attorney*—James E. Bryan

[57] ABSTRACT

A dry semi-permeable cellulose acetate membrane is processed from a wet cellulose acetate membrane having an active separating layer and a porous supporting layer. In the process, the wet membrane is immersed in an aqueous solution containing Two to 20 per cent by weight of an organic carboxylic acid having one to three carbon atoms, and 20 to 40 per cent by weight of a polyhydric alcohol having two or three carbon atoms, and dried at a temperature in the range of about 25° to 100° C.

5 Claims, No Drawings

PROCESS FOR PREPARING A DRY SEMI-PERMEABLE CELLULOSE ACETATE MEMBRANE

The present invention relates to a process for preparing a dry semi-permeable cellulose acetate membrane, by which it is achieved, by a treatment preceding drying, that the separating effect of the membrane is not reduced during drying.

It is known to produce semi-permeable membranes suitable for reverse osmosis or for ultra-filtration by casting a layer of a cellulose acetate solution onto a smooth support, evaporating part of the solvent from the surface of the applied layer, and then precipitating the cellulose acetate from the remainder of the solution constituting the applied layer. Normally, precipitation is caused by the action of a liquid which is miscible with the solvent of the cellulose acetate solution, but does not dissolve, or only insignificantly dissolves, the cellulose acetate component. When part of the solvent is evaporated, a superficial layer is formed which acts as the active separating layer of the resulting semi-permeable membrane, whereas the layer produced by precipitation forms a porous supporting layer which is easily penetrated by solutions. The cellulose acetate solution employed may contain pore-producing substances, especially water-soluble salts. In most cases, the semi-permeable membranes thus produced are after-treated by heating them in water. By this heat-treatment, the size of the micropores of the active layer is reduced. The efficiency of the finished semi-permeable membrane is substantially determined by the duration of this after-treatment in water and the heat applied. The preparation of such semi-permeable membranes is described in U. S. Pat. Nos. 3,133,132, 3,133,137, 3,170,867, 3,283,042, 3,310,488, 3,344,214, and 3,364,288.

The semi-permeable membranes thus obtained contain a considerable quantity of water, viz. about 60 to 70 percent by weight, and when they are kept in the open, with access to air, they dry further, which is undesirable because it reduces their effectiveness. For this reason, the finished semi-permeable membranes must be stored in water or in a humid atmosphere. Of course, production, storage and shipping of the membranes, as well as construction and operation of apparatuses equipped with them, are rendered more difficult by this requirement. Furthermore, even when kept in a humid environment, the cellulose acetate membranes undergo an unfavorable change due to hydrolytic decomposition, so they can be stored for a limited time only without substantial deterioration of their separating capacity.

Further, it is known to dry semi-permeable membranes more thoroughly in order to be able to store them under normal conditions without impairing their quality. For this purpose, the wet membrane — after being adjusted to the desired activity by heating in water — was immersed in an aqueous solution of a surface-active agent, e.g., dodecyl phenoxy polyethoxy ethanol, polyoxyethylene, or sodium lauryl sulfate, and then dried by suspending it for 1 hour in air at a temperature at 23° C at a relative humidity of 60 per cent. Advantageously, the aqueous solution of the surface active agent contains glycerol or ethylene glycol as a softener, in order to prevent the membrane from becoming brittle. The dry membranes thus obtained have about the same separating capacity as wet membranes, but their effectiveness is reduced when they are stored under normal conditions.

By another known process, the wet cellulose acetate membranes are dried by first impregnating them with a water-soluble solvent, e.g., an alcohol with 1 to 4 carbon atoms in the molecule, until the proportion of water in the membrane has been reduced to not more than 20 per cent by weight of the liquid contained in the membrane, and then removing the water-soluble solvent from the membrane by means of a non-polar solvent, such as hexane, cyclohexane, benzene, toluene, or xylene. However, by this process, too, the membranes lose some of their effectiveness.

The present invention provides a process for converting wet semi-permeable membranes into dry membranes which possess a separating capacity equal to that of wet membranes and do not lose this quality even during prolonged storage under normal atmospheric conditions. This is achieved by a process which is based on the known method of preparing a dry semi-permeable cellulose acetate membrane comprising an active separating layer and a porous supporting layer, wherein the membrane is immersed in an aqueous solution containing a polyhydric alcohol with two or three carbon atoms in the molecule and at least one additional substance, and then dried. The inventive feature of the new process is that the membrane is immersed in an aqueous solution which contains, as the additional substance, a proportion of two to 20 percent by weight of an organic carboxylic acid with one to three carbon atoms in the molecule, and a proportion of 20 to 40 per cent by weight of the polyhydric alcohol with two or three carbon atoms in the molecule, and the membrane is then dried at a temperature in the range between room temperature (25° C) and 100° C.

The starting material used in the method according to the invention is a wet semi-permeable cellulose acetate membrane produced as described in the above mentioned U.S. patents, which may also be reinforced by a fibrous support. Advantageously, cellulose acetate films are used having a content of about 37.5 to 41 percent by weight of acetyl groups, which corresponds to an about 2 to 2½acetate.

The organic acid contained in the aqueous solution to be used according to the invention is either formic acid, or acetic acid, or propionic acid. Normally, acetic acid will be preferred because of its low price. The polyhydric alcohol contained in the aqueous solution may be, e.g., ethylene glycol, propylene glycol, or glycerol. Glycerol has proved to be most advantageous, especially in combination with acetic acid, because the membranes produced are distinguished by a low flow resistance and a high separating effect.

The process of the invention represents an improvement in the art, because in most cases the dry membranes obtained have an improved shelf-life, i.e. their separating effect decreases more slowly during storage than in the case of the hitherto known dry membranes, and because they invariably lose less of their separating effect when compared with the wet membranes used as starting materials, than do membranes dried by hitherto known processes. In most cases, the membranes do not lose any of their separating effect when they are dried according to the process of the invention, and in some cases their separating effect is even increased.

The process of the invention is further distinguished by its simplicity and economy.

The invention will be further illustrated by reference to the following specific examples:

Example 1

A cellulose acetate membrane is produced in accordance with U. S. Pat. No. 3,344,214, except that a cellulose acetate having an acetyl group content of 39.8 per cent by weight is used. The cellulose acetate solution used for the production of the membrane had the following composition:

25 percent by weight of cellulose acetate (Eastman 39,810)
30 percent by weight of formamide, and
45 percent by weight of acetone.

The solution was cast onto a smooth base and the layer thus produced was then exposed for about 10 seconds, at 25° C, to the surrounding atmosphere in order to evaporate some of the acetone. The base with the layer thereon was then immersed for 5 minutes in water at 20° C. After removal from the base, the layer (i.e., the semi-permeable membrane) was conditioned by immersing it for 5 minutes in water at 82° C.

The membrane thus produced is the starting material which was subjected to the process of the invention. At a pressure of 40 atmospheres absolute and when using a 0.5 per cent sodium chloride solution, it had a water permeability of 830 liters per square meter over a period of 24 hours. It transmitted only 7.7 per cent of the sodium chloride contained in the solution, which means that its salt retaining capacity was 92.3 percent.

The drying process was performed as follows:

The membrane was immersed for 15 minutes, at 25° C., in a bath of:

5 percent by weight of glacial acetic acid,
30 percent by weight of glycerol, and
65 percent by weight of water.

After removal from the bath, the membrane was squeezed off and thus freed from the aqueous solution adhering to its surface, and then dried for 5 minutes at 60° C in a drying chamber.

The resulting membrane could be stored for many months under normal conditions without losing any of its separating capacity.

Under the conditions stated above, it had a water permeability of 920 liters and a salt retaining capacity of 95.9 per cent.

Example 2

The method described in Example 1 was repeated, except that the glacial acetic acid component was replaced by an equal quantity of formic acid in the drying process.

Under the conditions stated in Example 1, the wet membrane had a water permeability of 773 liters and a salt retaining capacity of 91.6 percent, and the dry membrane produced by the present process had a water permeability of 783 liters and a salt retaining capacity of 90.6 percent.

Example 3

The method used in Example 1 was repeated, except that the glycerol component was replaced by the same quantity of glycol in the drying process.

Under the conditions stated in Example 1, the wet membrane had a water permeability of 773 liters and a salt retaining capacity of 91.6 percent, and the dry membrane produced by the present process had a water permeability of 850 liters and a salt retaining capacity of 83.0 percent.

It will be obvious to those skilled in the art that many modifications may be made within the scope of the present invention without departing from the spirit thereof, and the invention includes all such modifications.

What is claimed is:

1. A process for preparing a dry semi-permeable cellulose acetate membrane having an active separating layer and a porous supporting layer, which process comprises immersing said membrane in an aqueous solution containing two to 20 percent by weight of an organic carboxylic acid having one to three carbon atoms, and
20 to 40 per cent by weight of a polyhydric alcohol having 2 or 3 carbon atoms, and
drying the membrane at a temperature in the range of about 25° to 100° C.

2. A process according to claim 1 in which the organic carboxylic acid is acetic acid.

3. A process according to claim 1 in which the polyhydric alcohol is glycerol.

4. A dry semi-permeable cellulose acetate membrane produced by the process of claim 1.

5. A membrane according to claim 4 reinforced by a fibrous support.

* * * * *